A. E. WELLS.
Improvement in Processes of Preparing Grain for Grinding.
No. 131,379. Patented Sep. 17, 1872.
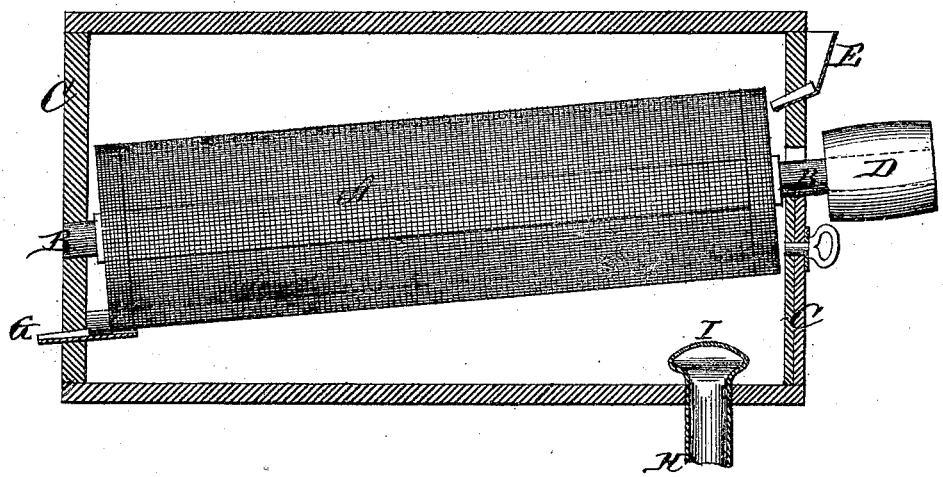

UNITED STATES PATENT OFFICE.

AARON E. WELLS, OF JAMESTOWN, NEW YORK.

IMPROVEMENT IN PROCESSES OF PREPARING GRAIN FOR GRINDING.

Specification forming part of Letters Patent No. 131,379, dated September 17, 1872.

*To all whom it may concern:*

Be it known that I, A. E. WELLS, of Jamestown, in the county of Chautauqua and State of New York, have invented certain new and useful Improvements in Machines for Steaming Grain; and I do hereby declare that the following is a full, clear, and exact description thereof, reference being had to the accompanying drawing and to the letters of reference marked thereon, which form a part of this specification.

One of the main causes of poor flour is in consequence of the wheat being so dry and hard that the shell which makes the bran breaks up and goes in with the flour, and cannot be properly bolted. To overcome this difficulty is the object of my invention; and it consists in an improved method of steaming the grain immediately before it passes to the stones by passing it through a revolving sieve within a steam-tight chamber, as will be hereinafter more fully set forth.

The accompanying drawing represents a longitudinal section of my device.

A represents a cylindrical wire or other suitable sieve, which is supported upon radiating arms from a central shaft, B. This shaft and cylinder are placed in an inclined position in a steam-tight box or chamber, C, the shaft having its bearings in the ends of the same, and upon the upper end of said shaft, outside of the box, is a pulley, D, to which the power is communicated for revolving the cylinder. At the end of the box, near the top, is a hopper, through which the grain is fed into the cylinder, and at the opposite end of the box, under the lower end of the cylinder, is a spout, G, through which the grain is discharged and conveyed directly to the stones for grinding without passing through other sieves. The steam is admitted through a pipe, H, in the bottom of the box, said pipe being, within the box, provided with a perforated cap, I, through the perforations of which the steam escapes into the box. By this means the grain becomes so far steamed during its passage through the revolving sieve A that the shells will not be broken up by the stones and cause poor flour.

Having thus fully described my invention, what I claim as new, and desire to secure by Letters Patent, is—

The improved method of steaming grain preparatory to grinding, by means of a perforated cylinder revolving within a steam-tight jacket or box, into which the steam is passed so as to permeate the whole mass of grain contained in said cylinder, the whole being arranged in such manner that a continuous flow and discharge of the grain so steamed directly into the burrs shall be secured, substantially as described.

In testimony that I claim the foregoing as my own I affix my signature in presence of two witnesses.

AARON E. WELLS.

Witnesses:
O. COOK,
L. W. WILTSIE.